(12) United States Patent
Chen

(10) Patent No.: US 9,381,797 B2
(45) Date of Patent: Jul. 5, 2016

(54) RECREATIONAL VEHICLE COVER

(71) Applicant: Zhixiong Chen, Xiamen (CN)

(72) Inventor: Zhixiong Chen, Xiamen (CN)

( * ) Notice: Subject to any disclaimer, the term of this patent is extended or adjusted under 35 U.S.C. 154(b) by 304 days.

(21) Appl. No.: 14/224,083

(22) Filed: Mar. 25, 2014

(65) Prior Publication Data

US 2015/0000807 A1   Jan. 1, 2015

(30) Foreign Application Priority Data

Jul. 1, 2013 (CN) ...................... 2013 2 0386889 U

(51) Int. Cl.
*B60J 11/04* (2006.01)
*B60J 7/10* (2006.01)
*B60J 7/08* (2006.01)
*B60P 7/04* (2006.01)

(52) U.S. Cl.
CPC . *B60J 11/04* (2013.01); *B60J 7/085* (2013.01); *B60J 7/104* (2013.01); *B60P 7/04* (2013.01)

(58) Field of Classification Search
CPC ........ A01G 9/1407; B60J 1/085; B60J 7/104; B60J 7/12; B60J 7/1204; B60J 7/085; B60J 11/04; B60P 3/32–3/341; B60P 7/04
See application file for complete search history.

(56) References Cited

U.S. PATENT DOCUMENTS

| | | | | |
|---|---|---|---|---|
| 3,044,653 A * | 7/1962 | Tantlinger | ................ | B60J 7/102 105/377.02 |
| 3,752,528 A * | 8/1973 | Barker | ...................... | B60P 3/34 296/104 |
| 4,245,375 A * | 1/1981 | Yoshida | ............... | A01G 9/1407 160/DIG. 18 |
| 4,883,305 A * | 11/1989 | Horton | ..................... | B60J 7/062 296/105 |
| 5,743,700 A * | 4/1998 | Wood, Jr. | ................. | B60J 7/085 296/98 |
| 6,142,553 A * | 11/2000 | Bodecker | ................ | B60J 7/085 135/903 |
| 6,595,568 B1 * | 7/2003 | Schroeder | ............ | B60R 13/011 296/39.1 |

* cited by examiner

*Primary Examiner* — Tri Mai
(74) *Attorney, Agent, or Firm* — Gokalp Bayramoglu

(57) ABSTRACT

The present invention discloses a recreational vehicle cover, especially a vehicle protecting cover. It is a long rectangle box with a faced down opening and is made of rain-proof and sun-resistant material, comprising a plurality of external surfaces of a right wall and a left wall thereof respectively disposed with a row of laces extended downward; a plurality of internal surfaces of a plurality of upper ends of the right and left walls of the long rectangle box respectively disposed with a row of pocket portions each comprising a pocket with a faced down opening and a pulling rope extended downward; a left rear zipper disposed between a rear edge of the left wall and a left edge of a rear wall of the long rectangle box; and a right rear zipper disposed between a rear edge of the right wall and a right edge of a rear wall.

3 Claims, 4 Drawing Sheets

RECREATIONAL VEHICLE COVER

FIELD OF THE INVENTION

The present invention relates to a recreational vehicle cover.

BACKGROUND OF THE INVENTION

Conventional recreational vehicle cover is a long rectangle box with a faced down opening and is made of rain-proof and sun-resistant material. For convenient to tie to the recreational vehicle, the bottom edge of the front wall and the rear wall of the cover are respectively disposed with elastic band, the external surfaces of the right and left walls are respectively disposed with a row of laces extending downward, the upper ends of each lace are sewn with a triangle reinforcing piece to a correspondent position of the centre of the external surface of a corresponding wall. However, as the recreational vehicles are taller and longer than normal cars, it is difficult to assemble the cover to the recreational vehicle compared to the assembly on a normal car wherein a user could easily assemble the cover just stand besides the normal car. When assembling the recreational vehicle cover, it is needed to be rolled along its length direction and then be spread out by one person on the vehicle roof; there further needs another person lower to cooperate with the person on the vehicle roof and set each wall of the cover in order to make them respectively covers the corresponding side of the recreational vehicle. Finally, each pair of the corresponding laces in the right and left sides of the recreational vehicle cover is tied together. With the elastic bands at the lower ends of the front wall and rear wall of the cover and the laces, the recreational vehicle cover is tightly fixed to the recreational vehicle. When dissembling the recreational vehicle cover, it needs one person to climb on the vehicle roof for lifting the front wall or the rear wall of the cover, rolling the cover and then throwing it to the ground.

However, people are not satisfactory with the conventional manner that is climb on the vehicle roof, spread the cover or roll the cover. The manner is hard and dangerous; and expected to be modified. It is desired that user could just stand by the car to assemble or dissemble the recreational vehicle cover.

SUMMARY OF THE INVENTION

The object of the present invention is provide a recreational vehicle cover; the user could assemble or dissemble the recreational vehicle cover just stand by the vehicle.

The technical proposal of the present invention is as blow:

A recreational vehicle cover configured as a long rectangle box with a faced down opening and is made of rain-proof and sun-resistant material, comprising: a plurality of external surfaces of a right wall and a left wall thereof respectively disposed with a row of laces extended downward; a plurality of internal surfaces of a plurality of upper ends of the right and left walls of the long rectangle box respectively disposed with a row of pocket portions each comprising a pocket with a faced down opening and a pulling rope extended downward; a left rear zipper disposed between a rear edge of the left wall and a left edge of a rear wall of the long rectangle box; and a right rear zipper disposed between a rear edge of the right wall and a right edge of a rear wall.

When assembling, firstly unzipping the left rear zipper and the right rear zipper of the left edge and the right edge of the rear wall; then turning the rear wall up to the top surface of the top wall. Two persons respectively hold a stick and stands by the rear ends of the left wall and the right wall; the upper ends of the two sticks are respectively inserted into the pockets of the pocket portions at the rear ends of the left wall and the right wall; the two persons also respectively hold the free ends of the pulling ropes of the corresponding pocket portions and walks towards the front end of the recreational vehicle; provided that the top wall of the recreational vehicle cover is higher than the vehicle roof of the recreational vehicle by the two sticks, the rear end of the recreational vehicle cover could be assembled to the front of the recreational vehicle by the pulling forces of the pulling ropes. Alternately inserting the upper ends of the two sticks to the pockets of the pocket portions in the different positions of the left wall and the right wall; and pulling the corresponding pulling ropes of the pockets toward the rear portion of the recreational vehicle, so the recreational vehicle cover is finally assembled on the recreational vehicle, the front wall of the recreational vehicle cover attaches the front end face of the recreational vehicle; then respectively drawing the two sticks out of the pockets of the pocket portions of at the front ends of the right wall and left wall 3. Pulling the rear wall from the top wall; zipping the left rear zipper and the right back zipper of the right and left edges of the rear wall; finally tying up each pair of the laces of the left wall and right wall of the recreational vehicle cover, so that the recreational vehicle cover is tightly fixed to the recreational vehicle. When dissembling the recreational vehicle cover, it only needs to release the lateral laces between the left wall and the right wall; unzip the zippers at the two sides of the rear wall. Then pull the edge of the front wall by hand and walking forward at the same time; so that the recreational vehicle cover could be dissembled from the recreational vehicle.

The user can assemble and disassemble the recreational vehicle cover just by standing by the vehicle.

In another preferred embodiment, a plurality of short belts are disposed on a bottom surface of a rear end of a top wall of the long rectangle box; a plurality of nylon fasteners are respectively disposed on a plurality of free ends of the short belts; a plurality of nylon fasteners are disposed on a top surface of a rear end of a top wall; when the rear wall of the long rectangle box is rolled up as a rear wall roll, the short belts are turned up to the rear wall roll, the nylon fasteners of the free ends of the short belts are fastened to the nylon fasteners of the top surface of the rear end of the top wall; and the short belts thus fixes the rear wall roll to the top surface of the rear end of the top wall. The combination of the short belts and nylon fasteners is capable of efficiently fixing the rear wall when assembling the recreational vehicle cover; thus preventing the rear wall from hanging and affecting the assembling; enabling the user to concentrate on assembling and the assembling speed is quickly.

In another preferred embodiment, The recreational vehicle cover according to claim 1, wherein each pocket portion on the internal surface of the upper end of the left wall of the long rectangle box is symmetrically arranged with each pocket portion on the internal surface of the right wall of the long rectangle box; a nylon fastener is respectively disposed on a free end of the pulling rope in each pocket portion; a nylon fastener is disposed on the left or wall which is disposed with the pocket portion; and the two sets of nylon fasteners are fastened together for hiding the pulling rope in an internal side of the left or right wall which is disposed with the pocket portion. So that it is convenient for two persons to assemble the recreational vehicle cover at the same time and hide the pulling rope after assembling.

The recreational vehicle cover of the present invention is capable of solving the problem that it needs one person to climb on the vehicle roof for assembling or dissembling the cover by applying the above structures of the present invention. It is not only save and labor saving; but also greatly improve the speed for assembling and disassembling. The structure is simple and of low cost; it could be popularized in various kinds of large vehicles, thus having broad application prospects.

DETAILED DESCRIPTION OF THE EMBODIMENTS

Figure 1:
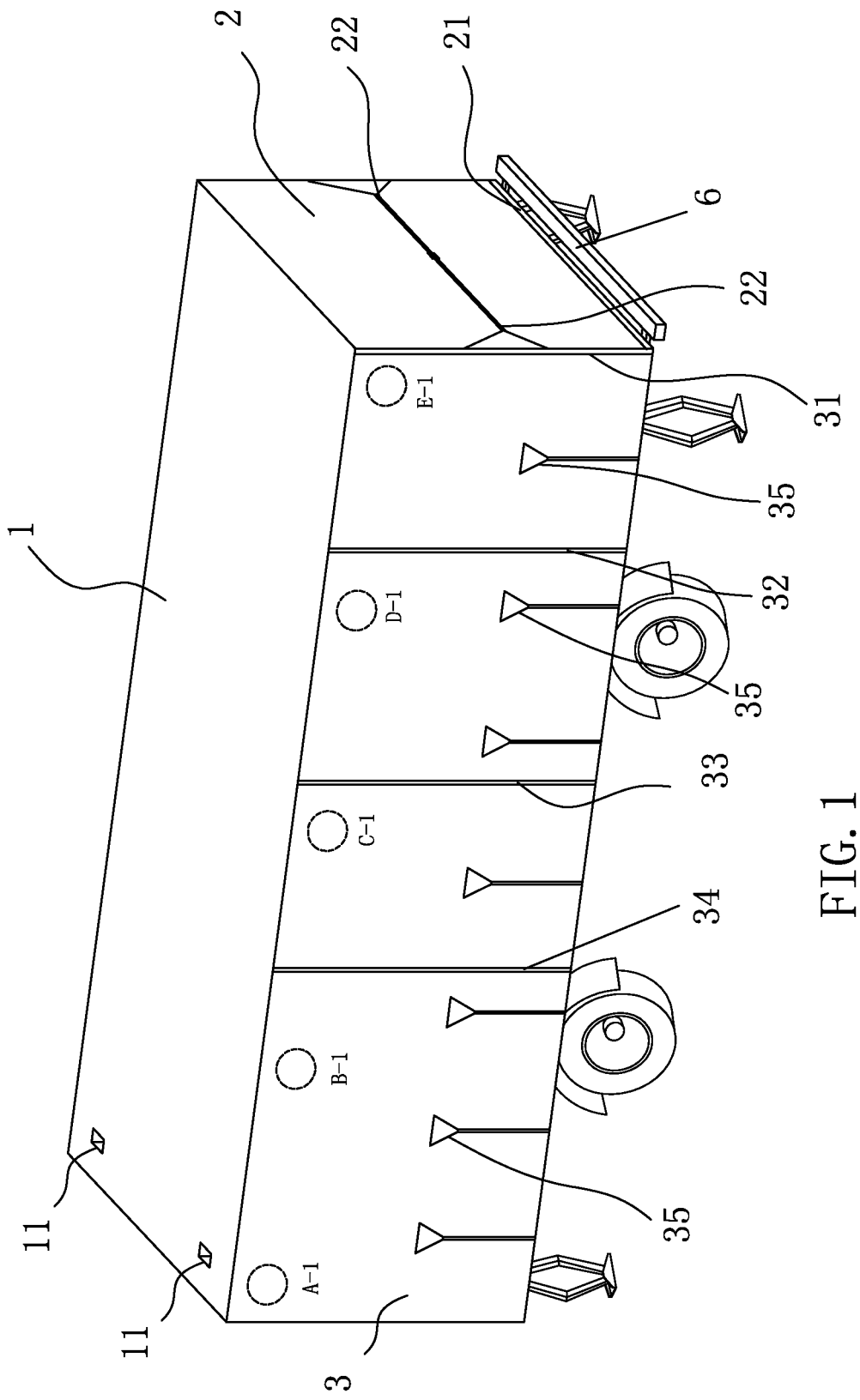
FIG. 1 illustrates a schematic diagram of the recreational vehicle cover of the present invention in usage.
Figure 2:
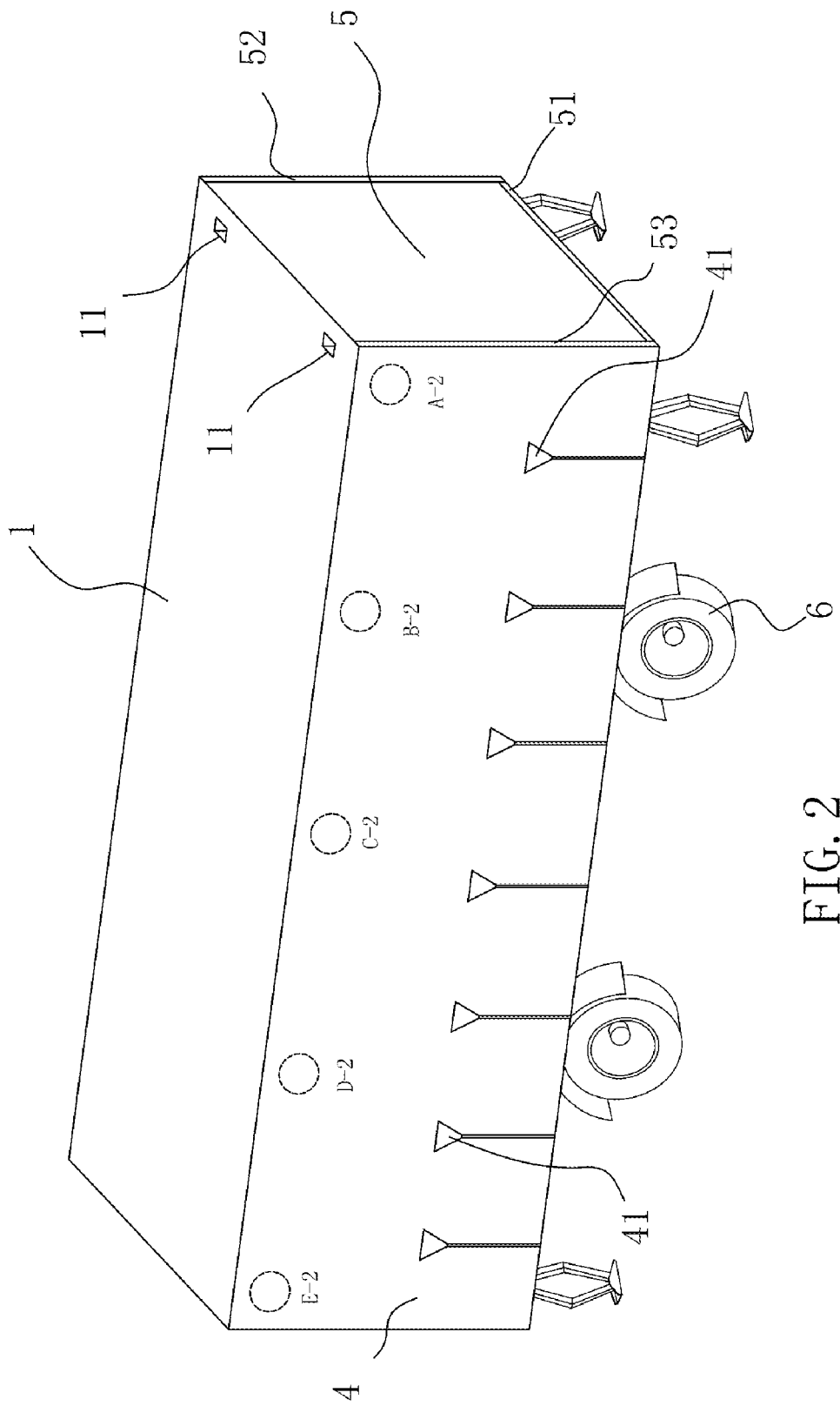
FIG. 2 illustrates a schematic diagram of the recreational vehicle cover of FIG. 1 in another view angle.

Disclosed is a recreational vehicle cover of an embodiment of the present invention in usage, as illustrated in FIG. 1 and FIG. 2. The recreational vehicle cover is a long rectangle box with a faced down opening and is made of rain-proof and sun-resistant material; the top surface of the rear end of top wall 1 thereof is disposed with two nylon fasteners 11 side by side; the bottom surface of the rear end of top wall 1 is disposed with two side by side short belts 12 (please refer to FIG. 4); the free ends of short belts 12 are respectively disposed with a nylon fastener. The bottom edge of front wall 2 is disposed with elastic band 21; the centers of the right and left sides of the external surface of front wall 2 are respectively with lateral lace 22 extended towards the centre; the external end of each lateral lace 22 is sewn with a triangle reinforcing piece to a position corresponding to the center of the external surface of an edge of corresponding side of front wall 2.

A row of laces 35 are disposed on the external surface of left wall 3 and extends downward; top ends of each lace 35 are respectively sewn with a triangle reinforcing piece to a position corresponding to the center of left wall 3. The internal surface of the upper end of left wall 3 is disposed with a row of five pocket portions 7 at regular distance and respectively in the positions of A-1, B-1, C-1, D-1, E-1 in FIG. 1; along the direction of from back to front. Left front zipper 31 is disposed between the front edge of left wall 3 and the left edge of front wall 2; front door zipper 32 is disposed at the front side of the left wall 3 and near the front door of the recreational vehicle; central door front zipper 33 and central door rear zipper 34 are respectively disposed at the center of left wall 3 and near the central door of the recreational vehicle. An external surface of right wall 4 is disposed with a row of laces 41 extending downward; upper ends of each lace 41 are respectively sewn with a triangle reinforcing piece to a position corresponding to the center of right wall 4. The internal surface of the upper end of right wall 4 is disposed with a row of five pocket portions 7 at regular distance and respectively in the positions A-2, B-2, C-2, D-2, and E-2 in FIG. 2; along the direction of from back to front. Each pocket portion 7 on the internal surfaces of the upper ends of left wall 3 and right wall 4 are symmetrically disposed. The bottom edge of rear wall 5 is disposed with elastic band 51. Left rear zipper 52 is disposed between the rear edge of left wall 3 and the left edge of rear wall 5; right rear zipper 53 is disposed between the rear edge of right wall 4 and the right edge of rear wall 5.

Figure 3:
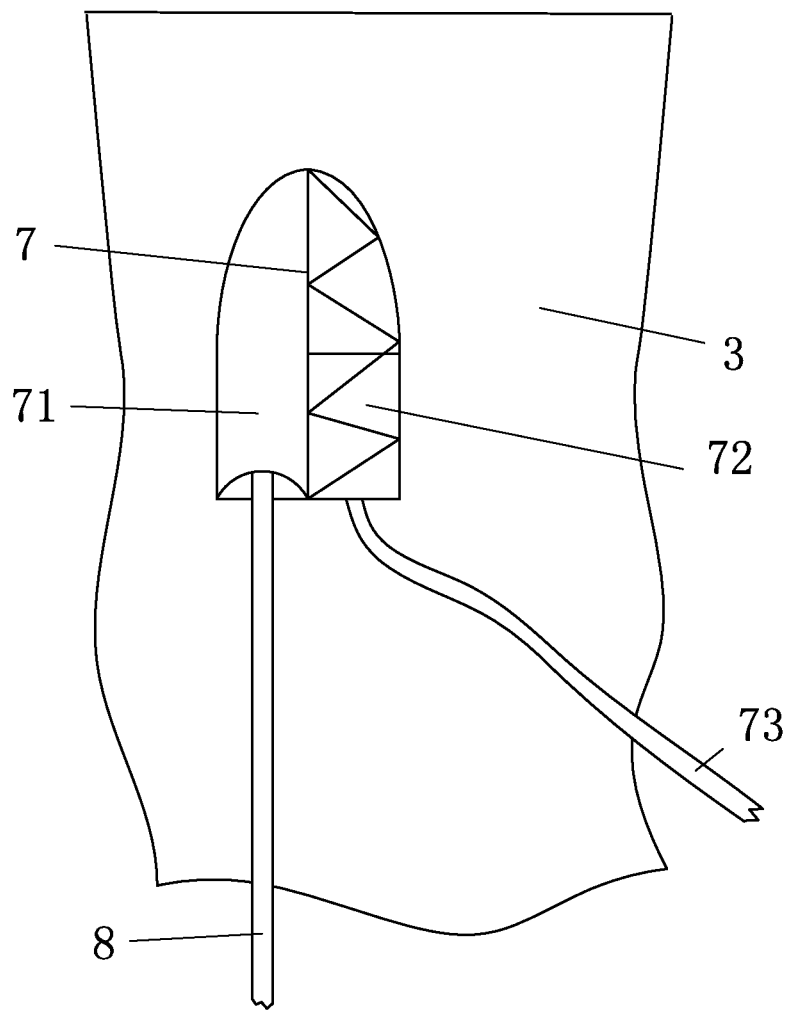
FIG. 3 illustrates a schematic diagram of a pocket portion of FIG. 1.

The structure of pocket portion 7 on left wall 3 is illustrated in FIG. 3. Pocket portion 7 comprises a pocket 71 with a faced down opening and a pulling rope 73 extends downward; pocket 71 is sewn to left wall 3; the upper end of rolling roper 73 is sewn on left wall 3 positioned on the rear side 72 of pocket 71. Another end of pulling rope 73 is disposed with a nylon fastener; and in a suitable position of left wall 3 is disposed with a corresponding nylon fastener, so that with the two nylon fasteners, rolling rope 73 is hidden in the internal side of left wall 3. Each pocket portion 7 of wall 4 is similar to above mentioned.

Figure 4:
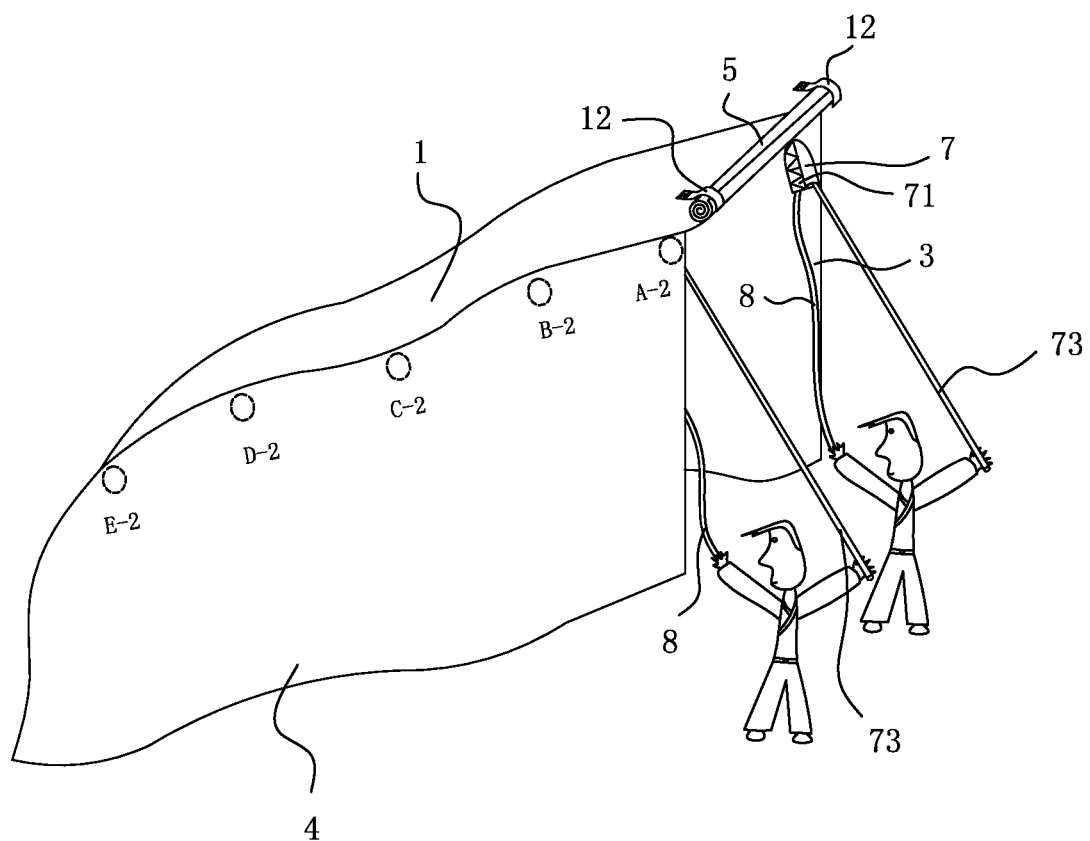
FIG. 4 illustrates a schematic diagram of the recreational vehicle cover of FIG. 1 being assembled to a recreational vehicle.

When assembling, please refer to FIG. 4: firstly unzipping left back zipper 52 and right back zipper 53 of the left edge and right edge of back wall 5; then rolling back wall 5 upward as a rear wall roll; making two short belts 12 respectively turned up to the rear wall roll; the nylon fasteners of the free ends of each short belt 12 are respectively fastened to the corresponding nylon fasteners 11 on the top surface in the rear end of top wall 1; with two short belts 12, the rear wall roll is fixed to the top surface of the rear end of top wall 1. Two persons are respectively standing by the rear end of left wall 3 and the rear end of right wall 4; each holds stick 8. The upper end of stick 8 held by a first person beside right wall 4 is inserted into pocket 71 of pocket portion 7 in A-2 position of the rear end of right wall 4; while the first person holds the free end of pulling rope 73 of pocket portion 7 with another hand. The upper end of stick 8 held by a second person besides left wall 3 is inserted into pocket 71 of pocket portion 7 in A-1 position in the rear end of left wall 3; while the second person holds the free end of the pulling rope of pocket portion 7 with another hand. Then the two persons walk toward the front end of the recreational vehicle; provided that top wall 1 of the recreational vehicle cover is higher than the vehicle roof, the rear end of the recreational vehicle cover can be assembled to the front of the recreational vehicle by the pulling force of pulling rope 73.

Then the two persons respectively insert the upper ends of the held sticks to pocket 71 of pocket portion 7 in position B-2 at the rear end of right wall 4 and pocket 71 of pocket portion 7 in position B-1 at the rear end of left wall 3. While the two persons respectively holds the free ends of pulling rope 73 of corresponding pocket portion 7 with their another hands, so as to assemble the rear portion of the recreational vehicle cover to the front of the recreational vehicle. In the next step, the upper end of sticks 8 respectively held by two persons are respectively inserted into pockets 71 of pocket portions 7 in position A-2 at the rear end of right wall 4 and pocket 71 of pocket portion 7 in the position A-1 at the rear end of left wall 3; while another hands of the two persons respectively holds the free ends of pulling rope 73 of the corresponding pocket portion 7, so as to assemble the rear end of the recreational vehicle cover to the center of the recreational vehicle. Then in the next step, the upper end of sticks 8 held by the two persons are respectively inserted into pockets 71 of pocket portions 7 in the position C-2 at the rear end of right wall 4 and pocket 71 of pocket portion 7 in the position C-1 at the rear end of left wall 3; while another hands of the two persons respectively holds the free ends of pulling rope 73 of the corresponding pocket portion 7, so as to assemble the center of the recreational vehicle cover to the rear portion of the recreational vehicle.

Operating with above manners over and over again, finally the front portion of the recreational vehicle cover is assembled to the front of the recreational vehicle, front wall 2 of the recreational vehicle cover is contacted to the front end face of the recreational vehicle. The upper end of two sticks 8 are get out of pocket 71 of pocket portion 7 in the position E-2 in the front end of right wall 4 and pocket 71 of pocket portion 7 in the position E-1 at the front end of left wall 3. Fastening the nylon fastener of the free end of the pulling rope of each pocket portion 7 to the corresponding nylon fastener in the internal side of right wall 4; separating the nylon fastener of the free end of the two short belts from the corresponding nylon fastener 11 on the top surface at the rear end of top wall 1; expanding the rear wall roll downward; pulling elastic band 51 at the bottom edge of the back wall 5 down; zipping the left back zipper 52 at the left edge of the rear wall 5 and the right rear zipper 53 at the right edge of rear wall 5. Pulling the edge of left wall 3 and the edge of right wall 4 down. Pulling elastic band 21 at the edge of front wall 2; tying lateral laces 22 in the right and left sides on the external surface of the front wall 2; finally, tying each pair of laces 35 and 41 at left wall 3 and right wall 4 of the recreational vehicle cover. With elastic bands 21 and 51 of front wall 2 and right wall 5, and laces 35 and 41; the recreational vehicle cover is tightly fixed to the recreational vehicle. If the front door is needed to open, releasing laces 22 at the center of front wall 2 and laces 35 and 41 between the front edge of left wall 3 and front door zipper 32; releasing left front zipper 31 between the front edge of left wall 3 and front wall 2 and front door zipper 32 at the front side of left wall 3. If the central door is needed to open, releasing laces 35 and 41 between central door front zipper 33 and central door back zipper 34; unzipping central door front zipper 33 and central door back zipper 34.

When dissembling the recreational vehicle cover, releasing lateral laces 22 at the center of front wall 2 and laces 35 and 41 between left wall 3 and right wall 41; unzipping zipper 52 and 53 at the two sides of rear wall 5. Pulling the edge of front wall 2 by hand and walking forward, so that the recreational vehicle cover can be taken off from the recreational vehicle.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

I claim:

1. A recreational vehicle cover configured as a long rectangle box with a faced down opening and is made of rainproof and sun-resistant material, comprising:
    a plurality of external surfaces of a right wall and a left wall thereof respectively disposed with a row of laces extended downward;
    a plurality of internal surfaces of a plurality of upper ends of the right and left walls of the long rectangle box respectively disposed with a row of pocket portions each comprising a pocket with a faced down opening and a pulling rope extended downward;
    a left rear zipper disposed between a rear edge of the left wall and a left edge of a rear wall of the long rectangle box; and
    a right rear zipper disposed between a rear edge of the right wall and a right edge of a rear wall.

2. The recreational vehicle cover according to claim 1, wherein a plurality of short belts are disposed on a bottom surface of a rear end of a top wall of the long rectangle box;
    a plurality of nylon fasteners are respectively disposed on a plurality of free ends of the short belts;
    a plurality of nylon fasteners are disposed on a top surface of a rear end of a top wall;
    when the rear wall of the long rectangle box is rolled up as a rear wall roll, the short belts are turned up to the rear wall roll, the nylon fasteners of the free ends of the short belts are fastened to the nylon fasteners of the top surface of the rear end of the top wall; and
    the short belts thus fixes the rear wall roll to the top surface of the rear end of the top wall.

3. The recreational vehicle cover according to claim 1, wherein each pocket portion on the internal surface of the upper end of the left wall of the long rectangle box is symmetrically arranged with each pocket portion on the internal surface of the right wall of the long rectangle box;
    a nylon fastener is respectively disposed on a free end of the pulling rope in each pocket portion;
    a nylon fastener is disposed on the left or right wall which is disposed with the pocket portion;
    and the two sets of nylon fasteners are fastened together for hiding the pulling rope in an internal side of the left or right wall which is disposed with the pocket portion.

\* \* \* \* \*